(12) United States Patent
Dutta et al.

(10) Patent No.: US 9,078,208 B1
(45) Date of Patent: Jul. 7, 2015

(54) POWER MODES OF COMPUTING DEVICES (75) Inventors: Aparna Shona Dutta, Los Altos Hills, CA (US); Michael Treaster, Mountain View, CA (US)

(73) Assignee: Google Inc., Mountain View, CA (US)

( * ) Notice: Subject to any disclaimer, the term of this patent is extended or adjusted under 35 U.S.C. 154(b) by 656 days.

(21) Appl. No.: 13/431,743

(22) Filed: Mar. 27, 2012

Related U.S. Application Data (60) Provisional application No. 61/606,784, filed on Mar. 5, 2012.

(51) Int. Cl.
*H04M 1/00* (2006.01)
*H04W 52/02* (2009.01)

(52) U.S. Cl.
CPC ..................... *H04W 52/02* (2013.01)

(58) Field of Classification Search
CPC .................................................... H04W 52/02
USPC ................ 455/574, 572, 187.1, 343.1–343.5, 455/550.1
See application file for complete search history.

(56) References Cited

U.S. PATENT DOCUMENTS

| | | | |
|---|---|---|---|
| 6,912,386 B1 | 6/2005 | Himberg et al. | |
| 7,016,705 B2 | 3/2006 | Bahl et al. | |
| 7,498,951 B2 | 3/2009 | Wardimon | |
| 8,135,443 B2 * | 3/2012 | Aleksic et al. | 455/574 |
| 2008/0218535 A1 | 9/2008 | Forstall et al. | |
| 2009/0312059 A1 | 12/2009 | Pratt et al. | |
| 2012/0252541 A1 * | 10/2012 | Thakur et al. | 455/574 |

* cited by examiner

*Primary Examiner* — Michael T Vu
(74) *Attorney, Agent, or Firm* — Shumaker & Sieffert, P.A.

(57) ABSTRACT

Various aspects of this disclosure are directed to setting, by a computing device including a group of electronic components, the group including at least an audio input device, a first time that indicates when the computing device transitions from a first power mode to a second power mode. Operation of the electronic components in the first power mode may use a first amount of power. Operation of the electronic components in the second power mode may use a second amount of power that is less than the first amount of power. The computing device may receive an audio input at a second time prior to the computing device transitioning from the first power mode to the second power mode. Responsive to receiving the audio input, the computing device may adjust the first time that indicates when the computing device transitions from the first power mode to the second power mode.

20 Claims, 4 Drawing Sheets

POWER MODES OF COMPUTING DEVICES

This application claims the benefit of U.S. Provisional Application No. 61/606,784 filed Mar. 5, 2012, the entire contents of which is incorporated herein by reference.

TECHNICAL FIELD

This disclosure relates to computing devices, and more particularly to power modes of computing devices.

BACKGROUND

Computing devices, such as cellular telephones and tablet computers, may be used for various functions, such as for telephonic communications, email communications, and to display information at a display of the computing device. Such computing devices may include a battery to provide power to components of the computing device when the computing device is not actively connected to an external power source. As such, the battery may enable the computing device to be used in a portable manner, or when an external power source is unavailable. However, batteries typically have a limited amount of electrical charge available with which to provide electrical power before the battery must be recharged, such as by connecting the battery to an external power source.

SUMMARY

In one example, various aspects of this disclosure are directed to a method that includes setting, by a mobile computing device comprising a battery and a group of electronic components, a first time that indicates when the mobile computing device transitions from a first power mode to a second power mode. Operation of the electronic components in the first power mode uses a first amount of power from the battery. Operation of the electronic components in the second power mode may use a second amount of power from the battery that is less than the first amount of power. The group of electronic components may include at least an audio input device. The method further comprises receiving, by the audio input device, an audio input at a second time prior to the mobile computing device transitioning from the first power mode to the second power mode, and responsive to receiving the audio input at the second time, adjusting, by the mobile computing device, the first time that indicates when the computing device transitions from the first power mode to the second power mode.

In another example, various aspects of this disclosure are directed to a computer-readable storage medium comprising instructions that, when executed, cause one or more processors of a computing device comprising a battery and a group of electronic components to perform operations that include setting a first time that indicates when the computing device transitions from a first power mode to a second power mode. Operation of the electronic components in the first power mode may use a first amount of power from the battery. Operation of the electronic components in the second power mode may use a second amount of power from the battery that is less than the first amount of power. The group of electronic components may include at least an audio input device. The computer-readable storage medium further comprises instructions that, when executed, cause the one or more processors of the computing device to perform operations that include receiving, by the audio input device, an audio input at a second time prior to the computing device transitioning from the first power mode to the second power mode, and responsive to receiving the audio input at the second time, adjusting the first time that indicates when the computing device transitions from the first power mode to the second power mode.

In another example, various aspects of this disclosure are directed to a computing device comprising at least one processor, a group of electronic components comprising at least an audio input device configured to receive an audio input, and a battery configured to provide power to at least the group of electronic components. The computing device further comprises a power mode analysis module operable by the at least one processor to set a first time that indicates when the computing device transitions from a first power mode to a second power mode, and receive an audio input from the audio input device at a second time prior to the computing device transitioning from the first power mode to the second power mode. Operation of the electronic components in the first power mode may use a first amount of power from the battery. Operation of the electronic components in the second power mode may use a second amount of power from the battery that is less than the first amount of power. The power mode analysis module is further operable by the at least one processor to adjust the first time that indicates when the computing device transitions from the first power mode to the second power mode responsive to receiving the audio input at the second time and based at least in part on the second time.

The details of one or more aspects of this disclosure are set forth in the accompanying drawings and the description below. Other features, objects, and advantages of the disclosure will be apparent from the description and drawings, and from the claims.

DETAILED DESCRIPTION

Computing devices, such as cellular telephones, laptop computers and tablet computers, may be used for various functions, such as for telephonic communications, email communications, and to display information at a display of the computing device. Many computing devices include a battery that may provide electrical power to electrical components of the computing device when the computing device is not connected to an external power source, thereby enabling the computing device to be used in a portable manner. However, such batteries typically have limited charge capacity. That is, such batteries are typically able to hold a limited amount of electrical charge with which to provide electrical power to the components before the battery must be recharged. Moreover, certain components of computing devices may use significant amounts of electrical power to operate, thereby draining the battery during operation. For instance, certain types of displays may use significant amounts of power to operate.

To help extend the charge life of the battery, computing devices may disable certain components when their use is not required. Similarly, computing devices may transition the computing device, or components of the computing device, to a reduced power consumption mode when the computing device determines that the component is not used for the current operation of the computing device. For example, to help reduce the amount of power drawn from the battery, a computing device may transition a display of the computing device to a reduced power mode when the computing device determines that the display is not used for current operation (e.g., because a user is not actively interacting with the computing device). For instance, computing devices may determine that, when a user has not pressed a button of the computing device or touched a touch-sensitive display of the computing device for a specified period of time (e.g., five minutes), the user is not actively interacting with the computing device. As such, computing devices may dim or disable a display of the computing device to reduce the power consumed by the display, thereby extending the charge life of the battery.

However, using such an approach, computing devices may disable or dim the display while the user is looking at content on the display, rather than interacting with the buttons or other controls of the computing device. The dimming or disabling of the display may prevent the user from reading the displayed content. Moreover, after disabling a display, computing devices may enter a security mode to "lock" the computing device, further requiring the user to enter a pass code or other security identification to unlock or otherwise re-enable the computing device. Such an interruption may distract the user and otherwise result in a less desirable user experience.

One or more aspects of this disclosure may enable a computing device to determine that a user may be actively interacting with the computing device and to adjust a time that indicates when the computing device transitions to a reduced power mode. Rather than requiring that a user press a button or touch a touch-sensitive interface of the computing device, for example, techniques of this disclosure may enable the computing device to determine that a user may be actively interacting with the computing device using various sensors of the computing device.

For example, a user may be looking at content displayed at a display of the computing device (e.g., an email, a web page, a video, or other content). Prior to the computing device transitioning from a first power mode (e.g., a full power mode) to a second power mode (e.g., a reduced power mode in which the electrical components of the computing device use an amount of power from the battery that is less than the amount of power used by the electrical components during operation in the first power mode), the user may provide a voice command indicating that the computing device is not to enter the second power mode. The computing device may adjust a time that indicates when the computing device transitions to the second power mode in response to receiving the voice command. In certain examples, the computing device may receive information from one or more sensors of the computing device, such as acceleration information from an accelerometer of the computing device, physical orientation information from a gyroscope of the computing device, physical proximity information from a physical proximity sensor of the computing device, or visual information from an image sensor of the device. The computing device may determine, based on the information received from the one or more sensors, that the user may be actively interacting with the computing device. In response, the computing device may adjust a time that indicates when the computing device transitions to the second power mode without requiring that the user press a button or touch a touch-sensitive interface of the computing device.

Figure 1:
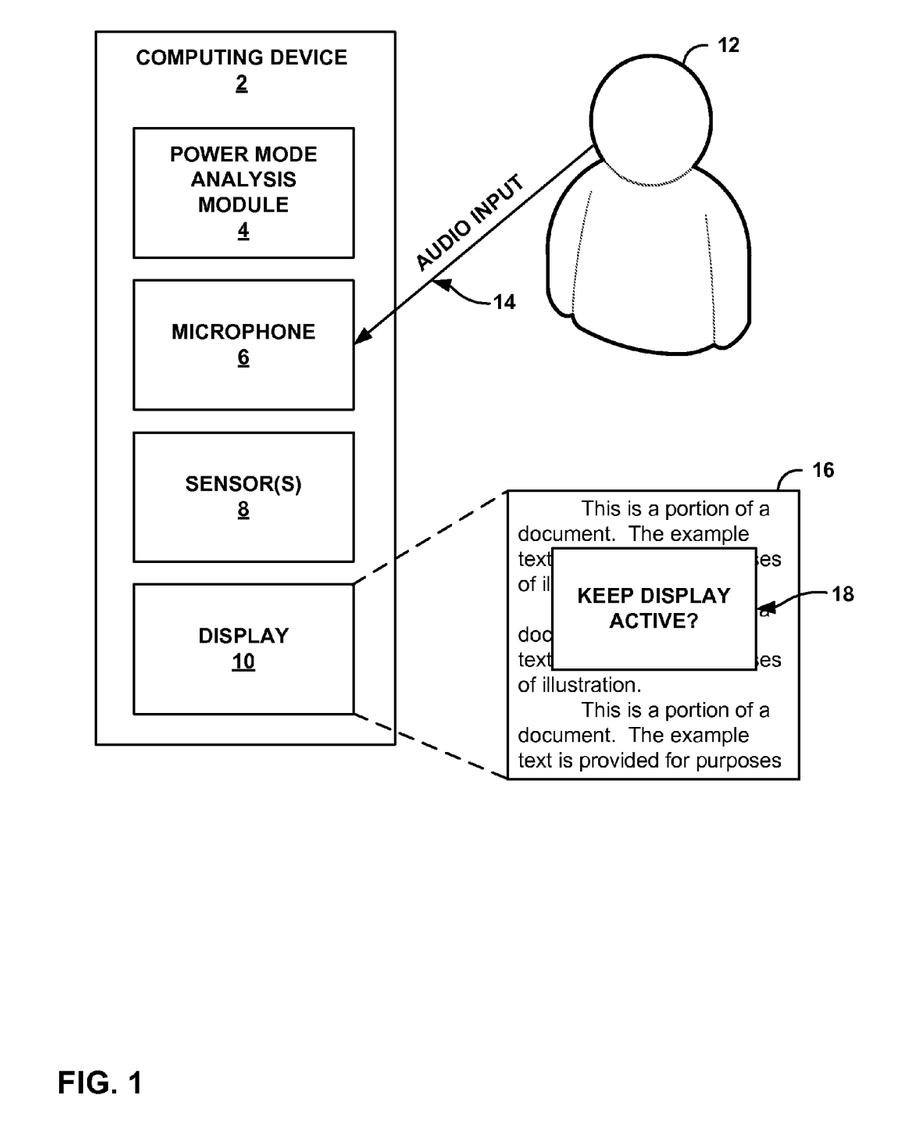
FIG. 1 is a conceptual diagram illustrating an example computing device that may be configured to control when the computing device transitions from a first power mode to a second power mode, in accordance with one or more aspects of this disclosure.

FIG. 1 is a conceptual diagram illustrating an example computing device that may be configured to control when the computing device transitions from a first power mode to a second power mode, in accordance with one or more aspects of this disclosure. As illustrated in FIG. 1, computing device 2 may include power mode analysis module 4, microphone 6, one or more sensors 8, and display 10. Examples of computing device 2 may include, but are not limited to, portable or mobile devices such as cellular phones, laptop computers, personal digital assistants (PDAs), portable gaming devices, portable media players, and e-book readers, as well as non-portable devices such as desktop computers.

Computing device 2 may cause graphical content, such as a graphical user interface 16, to be displayed at display 10. As illustrated in FIG. 1, graphical user interface 16 may include a textual document. In other examples, graphical user interface 16 may include other content, such as a web browser, an email, a short messaging service (SMS) message, or a video. Display 10 may be a liquid crystal display (LCD), e-ink, organic light emitting diode (OLED), or other display. Display 10 may present the content of computing device 2 to a user. For example, display 10 may present a web browser, or other functions that may need to be presented to a user. In some examples, display 10 may be a presence-sensitive screen that can allow a user to interact with the computing device 2.

Computing device 2 may cause power mode analysis module 4 to set a time that indicates when computing device 2 transitions from the current power mode (e.g., a full power mode) to a second power mode. As an example, power mode analysis module 4 may set the time that indicates when computing device 2 transitions form the current power mode to the second power mode in response to computing device 2 displaying graphical user interface 16. In certain examples, power mode analysis module 4 may set the time in response to one or more inputs received by computing device 2, such as a received button press from a button of computing device 2 (e.g., using user interface 28), an input received from a touch sensitive and/or presence sensitive display of computing device 2, and the like. The second power mode may be a reduced power mode. That is, computing device 2 may include electronic components, such as an audio input device (e.g., microphone 6, display 10, transceiver 30, and the like). Operation of the electronic components in the full power mode may use a first amount of power from the battery. Operation of the electronic components in the second power mode may use a second amount of power that is less than the first amount of power. As one example, in response to transitioning to the second power mode, computing device 2 may cause display 10 to dim. As another example, computing device 2 may disable display 10 in response to computing device 2 transitioning to the second power mode, thereby preventing display 10 from displaying graphical content. As such, computing device 2 may reduce the power used by display 10 when computing device 2 transitions to the second power mode.

Power mode analysis module 4 may, in some examples, initiate a timer that indicates when computing device 2 transitions to the second power mode based on a threshold value. Power mode analysis module 4 may compare the current time value of the timer to the threshold value to determine whether computing device 2 transitions to the second power mode. As an example, power mode analysis module 4 may initiate a timer at a value of zero seconds in response to display 10 displaying graphical user interface 16. Power mode analysis module 4 may increment the current time value of the timer, and may compare the current time value of the timer to a threshold value (e.g., five minutes). Power mode analysis module 4 may cause computing device 2 to transition to a second power mode (e.g., a reduced power mode) when the current time value of the timer is at least equal to the threshold value (e.g., the current time value of the timer is at least equal to five minutes).

User 12 may provide audio input 14 to computing device 2. Audio input 14 may, in some examples, include a voice command indicating that computing device 2 is not to transition to the second power mode. For instance, audio input 14 may include the word "awake," the phrase "stay awake phone," or other similar voice commands. Computing device 2 may receive audio input 14 using an audio input device, such as microphone 6. Computing device 2 may use voice recognition or other similar techniques to determine that audio input 14 indicates that computing device 2 is not to transition to the second power mode.

In some examples, computing device 2 may receive audio input 14 at a time prior to computing device 2 transitioning to the second power mode. In response, computing device 2 may cause power mode analysis module 4 to adjust the time that indicates when the computing device transitions from a first power mode to a second power mode based at least in part on the time when audio input 14 was received. For example, power mode analysis module 4 may reset a timer (e.g., a timer that power mode analysis module initiated in response to display 10 displaying graphical user interface 16) to a value of zero seconds. Power mode analysis module may subsequently increment the timer from the value of zero seconds, and may compare the current time value of the timer to a threshold value (e.g., five minutes) to determine whether computing device 2 transitions to the second power mode. As such, user 12 may provide audio input 14 to reset a time that indicates when computing device 2 transitions to a second power mode (e.g., a reduced power mode).

Computing device 2 may receive information from one or more sensors 8, and may adjust a time that indicates when computing device 2 transitions to a second power mode based on the information received from one or more sensors 8. Examples of one or more sensors 8 may include, but are not limited to, one or more accelerometers, one or more physical proximity sensors, one or more gyroscopes, one or more global positioning system (GPS) sensors, and one or more image sensors. Computing device 2 may determine that user 12 may be actively interacting with computing device 2 based on information received from one or more sensors 8, and may adjust a time that indicates when computing device 2 transitions to the second power mode in response to that determination. As an example, computing device 2 may receive acceleration information from an accelerometer of computing device 2 indicating that computing device 2 is moving. Such movement may indicate that user 12 is carrying computing device 2, and may be actively interacting with computing device 2. As another example, computing device 2 may receive physical orientation information from a gyroscope of computing device 2 indicating that the computing device 2 is at a physical orientation that indicates that user 12 may be actively interacting with computing device 2 (e.g., a physical orientation of forty-five degrees with respect to the ground). In response to the determination that user 12 may be actively interacting with computing device 2, computing device 2 may cause power mode analysis module 4 to adjust a time that indicates when computing device 2 transitions to the second power mode (e.g., a reduced power mode that may cause computing device 2 to dim or disable display 10).

In certain examples, computing device 2 may cause display 10 to display confirmation 18 before computing device 2 transitions to the second power mode. As in the example of FIG. 1, confirmation 18 may be a graphical confirmation. In other examples, confirmation 18 may be an audio confirmation. For instance, computing device 2 may cause a speaker of computing device 2 to output an audio confirmation, such as a beeping sound, a verbal message such as "keep display active," and the like. In response to confirmation 18, user 12 may provide an audio input indicating that computing device 2 is not to transition to the second power mode (e.g., audio input 14), or a physical input such as by pressing a button embedded in computing device 2, touching display 10 (e.g., as when display 10 includes a touch-sensitive or other presence-sensitive interface), shaking or otherwise moving computing device 2, or placing computing device 2 into a particular physical orientation (e.g., a physical orientation that is approximately forty-five degrees with respect to the ground).

As seen in the illustration of FIG. 1, rather than require a user to press a button or touch a touch-sensitive display of computing device 2, techniques of this disclosure may enable computing device 2 to determine that a user may be actively interacting with the computing device using an audio input device such as a microphone, or other sensors of computing device 2, and to adjust a time when the computing device enters a reduced power mode based on that determination. The techniques of this disclosure may therefore simplify the process for a user of preventing a computing device from entering a reduced power mode, and may therefore result in an enhanced user experience.

Figure 2:
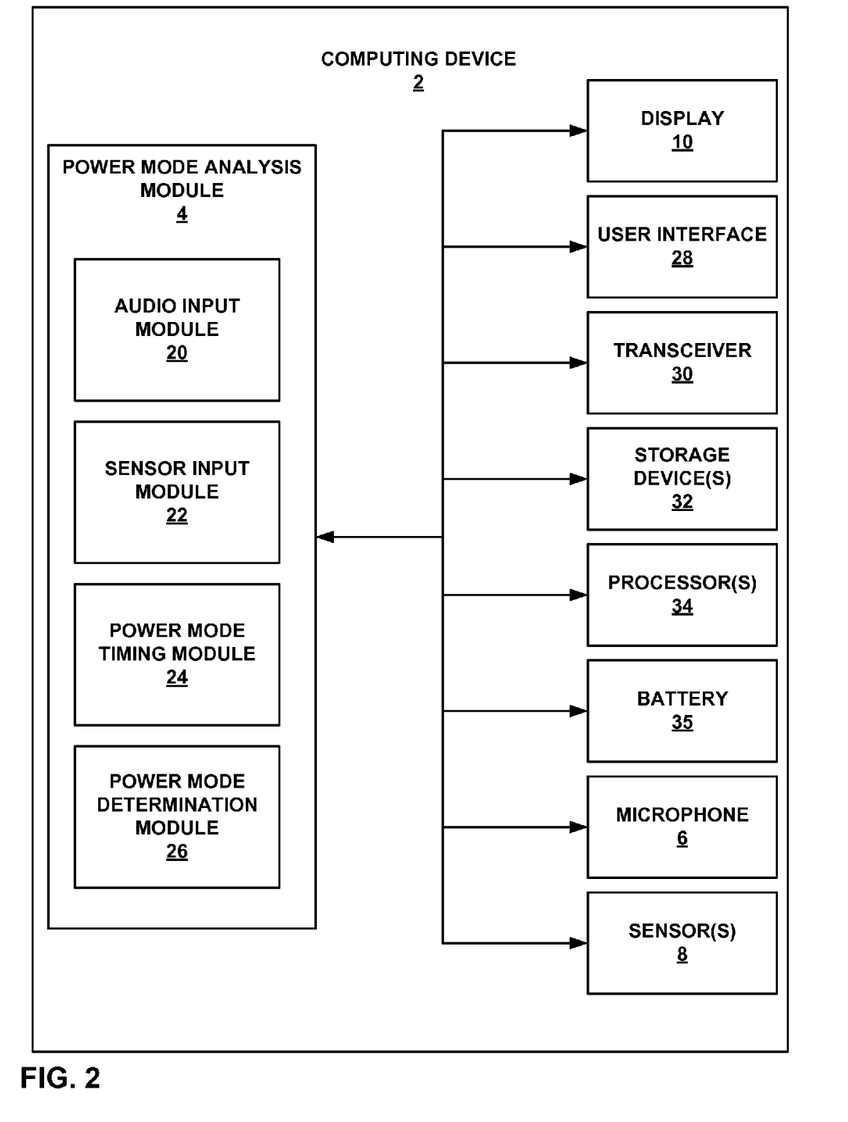
FIG. 2 is a block diagram illustrating one example of the computing device shown in FIG. 1, in accordance with one or more aspects of this disclosure.

FIG. 2 is a block diagram illustrating one example of the computing device shown in FIG. 1, in accordance with one or more aspects of this disclosure. As illustrated in FIG. 2, computing device 2 may include power mode analysis module 4, display 10, user interface 28, transceiver 30, one or more storage devices 32, one or more processors 34, microphone 6, and one or more sensors 8. Power mode analysis module 4 may include audio input module 20, sensor input module 22, power mode timing module 24, and power mode determination module 26.

Computing device 2 may include additional components not shown in FIG. 2 for clarity. For example, computing device 2 may include one or more speaker devices to provide audio output. Similarly, the components of computing device 2 shown in FIG. 2 may not be necessary in every example of computing device 2. For instance, computing device 2 may not include transceiver 30 when computing device 2 is not configured to send and receive data to a remote device.

Although shown as separate components in FIG. 2, in some examples, one or more of power mode analysis module 4, audio input module 20, sensor input module 22, power mode timing module 24, and power mode determination module 26 may be formed in a common hardware unit. In certain examples, one or more of power mode analysis module 4, audio input module 20, sensor input module 22, power mode timing module 24, and power mode determination module 26 may be software and/or firmware units that are executed on or operable by one or more processors 34.

One or more processors 34 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, one or more storage devices 32 may store one or more instructions that cause one or more processors 34 and modules 4, 20, 22, 24, and 26 to perform various functions ascribed to one or more processors 34 and modules 4, 20, 22, 24, and 26.

One or more storage devices 32 may include any form of machine- or computer-readable media. For example, one or more storage devices 32 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

One or more storage devices 32 may, in some examples, be considered as a non-transitory storage medium. In certain examples, one or more storage devices 32 may be considered as a tangible storage medium. The terms "non-transitory" and "tangible" may indicate that the storage medium is not embodied in a carrier wave or a propagated signal. However, the term "non-transitory" should not be interpreted to mean that one or more storage devices 32 are non-movable. As one example, one or more storage devices 32 may be removed from computing device 2, and moved to another device. As another example, one or more storage devices, substantially similar to one or more storage devices 32, may be inserted into computing device 2. In certain examples, a non-transitory storage medium may store data that can, over time, change (e.g., in RAM).

User interface 28 may allow a user of computing device 2 to interact with computing device 2. Examples of user interface 28 may include, but are not limited to, a keypad embedded on the computing device 2, a keyboard, a mouse, a roller ball, buttons, a touch screen, or other devices that allow a user to interact with computing device 2. In some examples, display 10 may present some or all of the functionality of user interface 28. For instance, display 10 may be a touch screen that can allow a user to interact with computing device 2.

Transceiver 30 may be configured to transmit data to and receive data from one or more remote devices, such as one or more servers or other devices (not illustrated). Transceiver 30 may support wireless or wired communication, and may include appropriate hardware and software to provide wireless or wired communication. For example, transceiver 30 may include one or more of an antenna, modulators, demodulators, amplifiers, and other circuitry to effectuate communication between computing device 2 and one or more remote devices.

Battery 35 may provide power to electronic components of computing device 2, such as display 10, one or more processors 34, one or more sensors 8, or other electronic components of computing device 2. Computing device 2 may be configured to operate in multiple power modes, such as a first power mode, a second power mode, a third power mode, and the like. Operation of the electronic components of computing device 2 may use amounts of power from the battery, the amounts differing depending upon the active power mode. For instance, operation of the electronic components of computing device 2 in the first power mode (e.g., a full power mode) may use a first amount of power from the battery. Operation of the electronic components of computing device 2 in the second power mode (e.g., a reduced power mode) may use a second amount of power from the battery that is less than the third amount of power. Similarly, operation of the electronic components in the third power mode may use a third amount of power from the battery that is less than both the first amount of power and the second amount of power.

Microphone 6 may be considered an audio input device to accept audio input. For example, microphone 6 may be used to receive audio input, such as a voice command from a user of computing device 2 (e.g., user 12 of FIG. 1). In certain examples, computing device 2 may use microphone 6 to determine a background audio volume level, such as the average of monitored audio volume levels over a period of time.

Computing device 2 may cause display 10 to display graphical content, such as a graphical user interface (e.g., graphical user interface 16 of FIG. 1). For example, computing device 2 may cause display 10 to display a web browser, an email, an SMS message, a video, or other graphical content. To help reduce the electrical power consumed by display 10, computing device 2 may cause power mode analysis module 4, executed by one or more processors 34, to set a time that indicates when computing device 2 transitions to a second power mode, such as a reduced power mode. When computing device 2 transitions to the second power mode, computing device 2 may cause display 10 to dim, thereby reducing the amount of power consumed by display 10. In certain examples, when computing device 2 transitions to the second power mode, computing device 2 may disable display 10, thereby preventing display 10 from displaying graphical content. As such, computing device 2 may further reduce the amount of power consumed by display 10.

Power mode timing module 24 may initiate a timer that indicates when computing device 2 transitions to the second power mode based on a threshold value. Power mode determination module 26 may compare the current time value of the timer to the threshold value, and may determine whether computing device 2 transitions to the second power mode based on the comparison.

As an example, computing device 2 may cause display 10 to display graphical content in a first power mode, such as a full power mode. In response, power mode timing module 24 may initiate a timer at a value of zero seconds. Power mode timing module 24 may increment the current time value of the timer (e.g., incremental values of one second) while the first power mode is the active power mode of computing device 2. Power mode determination module 26 may compare the current time value of the timer to a threshold value to determine whether computing device 2 transitions to a second power mode (e.g., a reduced power mode). For instance, the threshold value may be a value of five minutes. Power mode determination module 26 may compare the current time value of the timer to the threshold value of five minutes, and may determine that computing device 2 transitions to the second power mode when the current time value of the timer is at least equal to five minutes. The threshold value may be a configurable threshold value. For instance, the threshold value may be configurable by a user, such as by using user interface 28.

As another example, in response to computing device 2 causing display 10 to display graphical content in a full power mode, power mode timing module 24 may initiate a timer at a configurable value, and may decrement the current time value of the timer (e.g., decrements of one second) while the first power mode is the active power mode of computing device 2. Power mode determination module 26 may compare the current time value of the timer to a threshold value (e.g., zero hours, zero seconds and zero minutes), and may determine that computing device 2 transitions to the second power mode when the current time value of the timer is less than or equal to the threshold value. For instance, timing module 24 may initiate the timer at a value of five minutes, and may decrement the timer while the first power mode is the active power mode of computing device 2. Power mode determination module 26 may determine that computing device 2 transitions to the second power mode when the current time value of the timer is equal to zero hours, zero minutes, and zero seconds.

As another example, power mode timing module 24 may initiate a timer when computing device 2 is activated (e.g., when computing device 2 is turned on). Timing module 24 may continue to increment or decrement the timer while computing device 2 is active. In response to computing device 2 causing display 10 to display graphical content in a full power mode, power mode timing module 24 may adjust a threshold value such that the difference between the current time value of the timer when display 10 first displayed graphical content in the full power mode and the threshold value is equal to a configurable time difference. For instance, power mode timing module 24 may initiate a timer when computing device 2 is activated, and may begin incrementing the timer.

Computing device 2 may cause display 10 to display graphical content in a full power mode when, for example, the current time value of the timer is equal to ten minutes and thirty-seven seconds. In response, power mode timing module 24 may adjust a threshold value such that the difference between the current time value at the time when display 10 first displayed graphical content in the full power mode (i.e., ten minutes and thirty-seven seconds in the present example) and the threshold value is equal to a configurable time difference, such as five minutes. In the present example, power mode timing module 24 may adjust the threshold value to a value equal to fifteen minutes and thirty-seven seconds (i.e., ten minutes and thirty-seven seconds in addition to the five-minute configurable time difference of the present example). Power mode timing module 24 may continue to increment the timer while the full power mode is the active power mode of computing device 2. Power mode determination module 26 may compare the current time value of the timer to the threshold value (i.e., fifteen minutes and thirty-seven seconds in the present example), and may determine that computing device 2 transitions to the reduced power mode when the current time value of the timer is at least equal to the threshold value.

As another example, power mode timing module 26 may determine a time when computing device 2 transitions to a second power mode based on a current time of day. For instance, computing device 2 may include a clock module that determines a current time of day (e.g., three o'clock p.m.). Power mode timing module 26 may determine a time of day when computing device 2 transitions to a second power mode (e.g., a reduced power mode), such that the difference between the time of day when the computing device transitions to the second power mode (e.g., a transition time of day) and the current time of day is equal to a threshold value. Power mode timing module 26 may determine that computing device 2 is authorized to transition to the second power mode when the current time of day is at least equal to the transition time of day.

In certain examples, power mode timing module 24 may initiate a timer that indicates when computing device 2 transitions to a third power mode based on a threshold value. For instance, when computing device 2 transitions to the third power mode, computing device 2 may disable display 10, thereby preventing display 10 from displaying content. As an example, computing device 2 may cause display 10 to display content in a full power mode. Computing device 2 may cause display 10 to display content in the full power mode at a full brightness or contrast level. Power mode timing module 24 may initiate a timer that indicates when computing device 2 transitions to a second power mode based on a threshold value. The second power mode may be a reduced power mode, such that operation of electronic components in the second power mode uses an amount of power (e.g., from battery 35) that is less than the amount of power used by the electronic components during operation in the full power mode. When computing device 2 transitions to the second power mode, computing device 2 may cause display 10 to dim (e.g., display content at a reduced brightness or contrast level). As such, computing device 2 may reduce the electrical power consumed by display 10, as compared to the full power mode, when computing device 2 transitions to the second power mode. Power mode timing module 24 may further determine when computing device 2 transitions to a third power mode based on a comparison of a current time value of the timer to a second threshold value. For instance, when computing device 2 transitions to the third power mode, computing device 2 may disable display 10, thereby preventing display 10 from displaying content. As such, computing device 2 may further reduce the electrical power consumed by display 10 as compared to the full power mode or the second power mode. That is, in some examples, operation of electronic components of computing device 2 in the third power mode may use an amount of power (e.g., from battery 35) that is less than the amount of power used by the electrical components in the full power mode and less than the amount of power used by the electrical components in the second power mode.

There may be other timing techniques to determine that a configurable amount of time has elapsed. The above examples have been provided for purposes of illustration only, and techniques of this disclosure should not be considered limited to the above examples.

Computing device 2 may receive an audio input prior to computing device 2 transitioning to the second power mode (e.g., using microphone 6). In response, computing device 2 may cause power mode analysis module 4 to adjust the time that indicates when computing device 2 transitions to the second power mode (e.g., a reduced power mode). As an example, computing device 2 may receive an audio input including a voice command indicating that computing device 2 is not to transition to the second power mode. For instance, a user may provide an audio input including the voice command "awake," "phone stay awake," or other similar voice commands indicating that computing device 2 is not to transition to a reduced power mode. Audio input module 20 may receive the audio input, and may use voice recognition or other similar techniques to determine that the voice command has been received.

The voice command may be configurable, such as by using user interface 28. For instance, a user may enter a textual input using a virtual or embedded keyboard of user interface 28, specifying one or more voice commands that, when received by computing device 2, indicate that computing device 2 is not to transition to a reduced power mode. Similarly, a user may configure the voice command audibly, such as by speaking one or more voice commands that may be received by microphone 6.

Audio input module 20 may store the one or more voice commands, such as at one or more storage devices 32, and may compare a received audio input to the stored voice commands to determine whether a voice command has been received indicating that computing device 2 is not to enter a reduced power mode. Responsive to receiving a voice command indicating that computing device 2 is not to enter a reduced power mode, audio input module 20 may cause power mode timing module 24 to adjust the time that indicates when the computing device transitions to the second power mode. For instance, audio input module 20 may receive the voice command "awake," and may cause power mode timing module 24 to reset a timer indicating when computing device 2 transitions to a reduced power mode.

In certain examples, a user may provide a voice command indicating a duration of time during which computing device 2 is not to transition to a reduced power mode. For example, audio input module 20 may receive a voice command indicating such a time duration, such as the voice command "don't sleep for fifteen minutes." Audio input module 20 may use voice recognition or other similar techniques to determine that the voice command indicates that computing device 2 is not to transition to a reduced power mode for the time duration indicated by the received voice command. Audio input module 20 may cause power mode timing module 24 to adjust the time that indicates when computing device 2 transitions to the reduced power mode based on the time indicated in the received voice command. Similarly, audio input module 20 may receive a voice command indicating that computing device 2 is not to transition to a reduced power mode for an indefinite period of time, such as the voice command "never sleep." In such an example, power mode determination module 26 may determine that computing device 2 is not to transition to a reduced power mode.

In some examples, audio input module 20 may receive an audio input, and may compare a volume level of the received audio input to a background audio volume level to determine whether to adjust the time that indicates when the computing device transitions to the second power mode. As an example, audio input module 20 may monitor the audio volume level of audio inputs received while the full power mode is the active power mode of computing device 2. Audio input module 20 may determine a background audio volume level based on the monitored audio volume levels. For instance, audio input module 20 may determine the background audio volume level as the average of the monitored audio volume levels.

Audio input module 20 may compare the background audio volume level and the volume level of a received audio input to determine a difference between the background audio volume level and the volume level of the received audio input. Audio input module 20 may compare the difference between the background audio volume level and the volume level of the received audio input to a threshold value. The threshold value may be configurable, such as by using user interface 28. Audio input module 20 may determine that the received audio input indicates that computing device 2 is not to transition to the second power mode (e.g., a reduced power mode) if the magnitude of the difference between the volume level of the received audio input and the background audio volume level is greater than the threshold value. Responsive to determining that the magnitude of the difference between the volume level of the received audio input and the background audio volume level is greater than the threshold value, audio input module 20 may cause power mode timing module 24 to adjust the time that indicates when the computing device transitions to the second power mode.

Computing device 2 may receive information from one or more sensors 8, and may adjust a time that indicates when computing device 2 transitions to a second power mode based on the information received from one or more sensors 8. Examples of one or more sensors 8 may include, but are not limited to, one or more accelerometers, one or more physical proximity sensors, one or more gyroscopes, one or more GPS sensors, and one or more image sensors (e.g., such as may be incorporated in a camera of computing device 2).

As one example, one or more sensors 8 may include one or more accelerometers. Sensor input module 22 may obtain acceleration information from an accelerometer of computing device 2. The obtained acceleration information may indicate that computing device 2 is moving. For instance, sensor input module 22 may compare the obtained acceleration information to a threshold value. The threshold value may be a configurable threshold value. In other examples, the threshold value may not be configurable by a user. For instance, the threshold value may be a factory default threshold value that a user may not configure. Sensor input module 22 may determine that computing device 2 is moving if the acceleration information indicates an acceleration greater than the threshold value. Such movement may indicate that a user is actively interacting with computing device 2. In response, sensor input module 22 may cause power mode timing module 24 to adjust the time that indicates when computing device 2 transitions to the second power mode.

Sensor input module 22 may determine that a user has provided a user input indicating that computing device is not to transition to a second power mode, such as by shaking computing device 2. For example, acceleration information obtained from one or more accelerometers of computing device 2 may indicate that two or more accelerations and two or more decelerations, each at least equal to a configurable acceleration threshold value, are received within a threshold time value. The two or more acceleration and two or more decelerations may indicate that a user has shaken computing device 2 (e.g., from side to side, up and down, etc.) as a user input indicating that computing device 2 is not to transition to a second power mode. Sensor input module 22 may compare the accelerations and decelerations to a configurable threshold acceleration value to help ensure that the indicated accelerations and decelerations constitute a user input, as opposed to slight movements that may not be intended as user input. In response to determining that the obtained acceleration information indicates a user input, sensor input module 22 may cause power mode timing module 24 to adjust the time that indicates when computing device 2 transitions to the second power mode.

As another example, one or more sensors 8 may include one or more gyroscopes. Sensor input module 22 may obtain physical orientation information from a gyroscope of computing device 2. The physical orientation information may indicate that a user may be actively interacting with computing device 2. For example, sensor input module 22 may determine that a user may be actively interacting with computing device 2 when the obtained orientation information indicates that computing device 2 is physically oriented at an angle of approximately forty-five degrees from horizontal (e.g., with respect to the ground). Such a physical orientation (e.g., approximately forty-five degrees with respect to the ground) may indicate that a user is holding computing device 2, such as to view display 10.

Similarly, sensor input module 22 may obtain physical orientation information from one or more accelerometers of computing device 2. For instance, sensor input module 22 may determine the orientation of computing device 2, such as by performing a double integral (or numerical approximations thereof) on obtained acceleration information with respect to time.

The physical orientation indicating that a user is actively interacting with computing device 2 may include a configurable range of physical orientations with respect to a horizontal axis (e.g., configurable using user interface 28). Examples of such ranges may include, but are not limited to, thirty degrees to sixty degrees, forty degrees to fifty degrees, forty-two degrees to forty-eight degrees, and the like. In response to determining that the physical orientation of computing device 2 indicates that a user may be actively interacting with computing device 2, sensor input module 22 may cause power mode timing module 24 to adjust the time that indicates when computing device 2 transitions to the second power mode.

As another example, one or more sensors 8 may include one or more image sensors, such as may be included in a camera of computing device 2 (e.g., a user-facing camera). Sensor input module 22 may obtain visual information from an image sensor of computing device 2. The visual information may indicate that a user may be actively interacting with computing device 2, such as when the visual information indicates that the user is looking at computing device 2. Sensor input module 22 may use facial recognition techniques, eye tracking techniques, or other similar techniques to determine that a user may be looking at computing device 2. For instance, when computing device 2 includes a user-facing camera, sensor input module 22 may use facial recognition techniques to determine the relative orientation of the user's face with respect to the camera based on the obtained visual information. When, for example, the obtained visual information indicates that the front of the user's face is directed toward the camera, sensor input module 22 may determine that the user is looking at computing device 2. In contrast, when the obtained visual information indicates that the side of a user's face is directed toward the camera, sensor input module 22 may determine that the user is not looking at computing device 2. In response to determining that the obtained visual information indicates that a user is looking at computing device 2, sensor input module 22 may cause power mode timing module 24 to adjust the time that indicates when computing device 2 transitions to the second power mode. For instance, sensor input module 22 may cause power mode timing module 24 to reset a timer that indicates when computing device 2 transitions to a reduced power mode.

In certain examples, visual information obtained from an image sensor of computing device 2 may indicate that a user may not be actively using computing device 2. For instance, the obtained visual information may indicate only darkness, possibly indicating that computing device 2 may be positioned in a user's pocket. In such an example, sensor input module 22 may cause power mode timing module 24 to transition to a reduced power mode, or may reduce a time indicating when computing device 2 transitions to a reduced power mode. As such, computing device 2 may transition to a reduced power mode in response to a determination sensor input module that a user may not be actively interacting with computing device 2.

As another example, one or more sensors 8 may include one or more physical proximity sensors. Sensor input module 22 may obtain physical proximity information from a physical proximity sensor of computing device 2. The physical proximity information may indicate that a user may be actively interacting with computing device 2. As an example, the physical proximity information may indicate that a distance of the computing device to another object is greater than or equal to a configurable threshold distance (e.g., configurable using user interface 28). As such, sensor input module 22 may determine that computing device 2 may be not be placed next to a user's ear, such for use as a telecommunications device, or in a user's pocket. Sensor input module 22 may determine that in such a scenario, display 10 may be needed for the current operation of computing device 2. As such, sensor input module 22 may cause power mode determination module 26 to adjust the time that indicates when computing device 2 transitions to the second power mode.

As another example, sensors input module 22 may obtain geographic location information of computing device 2. For example, one or more sensors 8 may include one or more GPS sensors. Sensors input module 22 may obtain geographic location information from a GPS sensor of computing device 2. As another example, sensors input module 22 may obtain geographic location information, such as by using cellular tower triangulation techniques, or by obtaining geographic location information about a wireless network to which computing device 2 is connected. Power mode determination module 26 may adjust the time that indicates when computing device 2 transitions to the second power mode (e.g., a reduced power mode) based on the obtained geographic location information. For instance, the geographic location information may indicate computing device 2 is at or near a user's home or office, and therefore near a presumed power source to recharge a battery of computing device 2. In such case, power mode determination module 26 may increase a time indicating when computing device 2 transitions to a reduced power mode. Similarly, power mode determination module 26 may decrease a time indicating when computing device 2 transitions to a reduced power mode when obtained geographic location information indicates that computing device 2 is not at or near a user's home or office.

Power mode analysis module 4 may, in some examples, use inputs received from microphone 6 and one or more sensors 8 alone, or in combination, to determine whether to adjust the time that indicates when computing device 2 transitions to the second power mode. As one example, power mode analysis module 4 may use audio inputs received from microphone 6 alone to determine whether to adjust the time that indicates when computing device 2 transitions to the second power mode. As another example, power mode analysis module 4 may use information used from any one of one or more sensors 8 to determine whether to adjust the time that indicates when computing device 2 transitions to the second power mode. For instance, power mode analysis module 4 may obtain acceleration information from an accelerometer of computing device 2, and may adjust the time that indicates when computing device 2 transitions to the second power mode based on the obtained acceleration information alone.

As another example, power mode analysis module 4 may use a combination of inputs received from any of microphone 6 and one or more sensors 8 to determine whether to adjust the time that indicates when computing device 2 transitions to the second power mode. For instance, power mode analysis module 4 may obtain acceleration information from an accelerometer of computing device 2 and physical orientation information from a gyroscope of computing device 2. Sensor input module 22 may determine, based on the obtained acceleration information, that computing device 2 is moving. Sensor input module 22 may determine, based on the obtained physical orientation information, that computing device 2 is at a physical orientation indicating that a user may be actively interacting with computing device 2. Sensor input module 22 may cause power mode timing module 24 to adjust the time that indicates when computing device 2 transitions to the second power mode based on the combination of the obtained acceleration information and the obtained physical orientation information. For instance, sensor input module 22 may cause power mode timing module 24 to adjust the time that indicates when computing device 2 transitions to the second power mode because both the acceleration information and the physical orientation information indicate that a user may be actively interacting with computing device 2 (e.g., the acceleration information indicating that computing device 2 is moving and the physical orientation information indicating a physical orientation that suggests a user may be actively interacting with computing device 2).

Similarly, audio input module 20 may determine that computing device 2 has received an audio input indicating that computing device 2 is not to transition to a reduced power mode, and sensor input module 22 may determine that a user is looking at computing device 2 (e.g., based on visual information obtained from an image sensor, such as may be included in a user-facing camera of computing device 2). Power mode analysis module 4 may adjust the adjust the time that indicates when computing device 2 transitions to the second power mode based on the combined information obtained from microphone 6 and the image sensor.

In such a way, power mode analysis module 4 may adjust the time that indicates when computing device 2 transitions from a first power mode (e.g., a full power mode) to the second power mode (e.g., a reduced power mode) based on information received from any one of microphone 6, an accelerometer of computing device 2, a gyroscope of computing device 2, a physical proximity sensor of computing device 2, a GPS sensor of computing device 2, or an image sensor of computing device 2. In addition, power mode analysis module 4 may adjust the time that indicates when computing device 2 transitions from the first power mode to the second power mode based on information received from any combination of microphone 6, accelerometer of computing device 2, gyroscope of computing device 2, physical proximity sensor of computing device 2, GPS sensor of computing device 2, or image sensor of computing device 2.

In certain examples, power mode analysis module 4 may cause computing device 2 to transition to a third power mode based on a comparison of a current time value of the timer to a threshold value. For instance, when computing device 2 transitions to the third power mode, computing device 2 may disable display 10, thereby preventing display 10 from displaying content (e.g., turning off display 10). Power mode analysis module may, in some examples, determine that information received from one or more of microphone 6 or one or more sensors 8 does not cause computing device 2 to transition to a second power mode or a full power mode. For instance, power mode analysis module 4 may cause computing device 2 to transition to a third power mode. In response, computing device 2 may disable display 10. After transitioning to the third power mode, computing device 2 may receive information from one or more of microphone 6 or one or more sensors 8. Power mode analysis module 4 may determine that computing device 2 does not transition out of the third power mode (e.g., does not transition from the third power mode to either a second power or a full power mode) based on the information received from microphone 6 or one or more sensors 8. In such an example, computing device 2 may transition to the second power mode or the full power mode based on information received using user interface 28 (e.g., a button press or an input from a presence-sensitive display of computing device 2).

As such, power mode analysis module 4 may adjust a time indicating when computing device 2 transitions to a second power mode (e.g., a reduced power mode whereby computing device 2 causes display 10 to dim in response to computing device 2 transitioning to the second power mode) or a third power mode (e.g., a reduced power mode whereby computing device 2 disables display 10 in response to computing device 2 transitioning to the third power mode) in response to information received from one or more of microphone 6 or one or more sensors 8. However, in some examples, power mode analysis module 4 may not cause computing device 2 to transition from the third power mode to another power mode based on the information received from microphone 6 or one or more sensors 8.

In certain examples, adjusting a time indicating when computing device 2 transitions to a second power mode or a third power mode may include decreasing a time when computing device 2 transitions to the second power mode or the third power mode. For example, computing device 2 may determine, based on information received from one or more of microphone 6 or one or more sensors 8, that a user may not be actively interacting with computing device 2. As such, power mode analysis module 4 may determine that computing device 2 is authorized to transition to a reduced power mode at an earlier time than is indicated by a current timer or threshold value.

For instance, computing device 2 may receive visual information from one or more image sensors of computing device 2 (e.g., as may be included in a camera of computing device 2) that may indicate that a user may not be actively interacting with computing device 2. As an example, the visual information may indicate only "blackness," possibly indicating that computing device 2 is in a user's pocket, or otherwise positioned such that the user is not actively interacting with computing device 2. Similarly, the visual information may indicate that the user is not looking at computing device 2. In such examples, computing device 2 may decrease a time indicating when computing device 2 transitions to a reduced power mode. For example, power mode analysis module 4 may decrease a current time value of a timer indicating when computing device 2 transitions to a reduced power mode (e.g., as when power mode timing module 24 decrements a timer indicating when computing device 2 transitions to a reduced power mode). Similarly, power mode analysis module 4 may adjust a threshold time value such that the difference between the current time value of a timer and the adjusted threshold time value is less than the difference between the current time value of the timer and the unadjusted threshold time value. As such, in response to determining that a user may not be actively interacting with computing device 2, power mode analysis module 4 may authorize computing device 2 to transition to a reduced power mode at an earlier time.

Computing device 2 may, in some examples, reverse recent power mode changes based on information received from one or more of microphone 6 or one or more sensors 8. As one example, computing device 2 may transition to a reduced power mode, and may cause display 10 to dim. In such an example, it may be that a user of computing device 2 was actively using, or was about to use computing device 2. The user may, in such an example, provide an input to cause computing device 2 to transition from the reduced power mode to a full power mode. For instance, a user may shake computing device 2 to indicate that computing device 2 is to transition to the full power mode. Responsive to receiving such acceleration information from an accelerometer of computing device 2 (e.g., two or more accelerations and two or more decelerations within a threshold time), computing device 2 may transition from the reduced power mode to a full power mode (e.g., causing display 10 to display content at a full brightness level). Similarly, computing device 2 may receive audio information from microphone 6 indicating that computing device 2 is to transition to from the reduced power mode to a full power mode. For instance, computing device 2 may receive a voice command, such as "awake," "stay awake," "don't sleep," and the like. In response, computing device 2 may transition from the reduced power mode to the full power mode.

In some examples, computing device 2 may transition from the reduced power mode to a full power mode only if computing device 2 receives such information from microphone 6 or one or more sensors 8 within a threshold time after computing device 2 transitions to the reduced power mode. In certain examples, when computing device 2 transitions to the reduced power mode, computing device 2 may enter a security mode to "lock" the computing device, further requiring the user to enter a pass code or other security identification to unlock or otherwise re-enable the computing device. When computing device 2 receives information from microphone 6 or one or more sensors 8 indicating that computing device 2 is to transition from the reduced power mode to a full power mode, computing device 2 may bypass the security identification mechanisms when computing device 2 receives such information within the threshold time.

Figure 3:
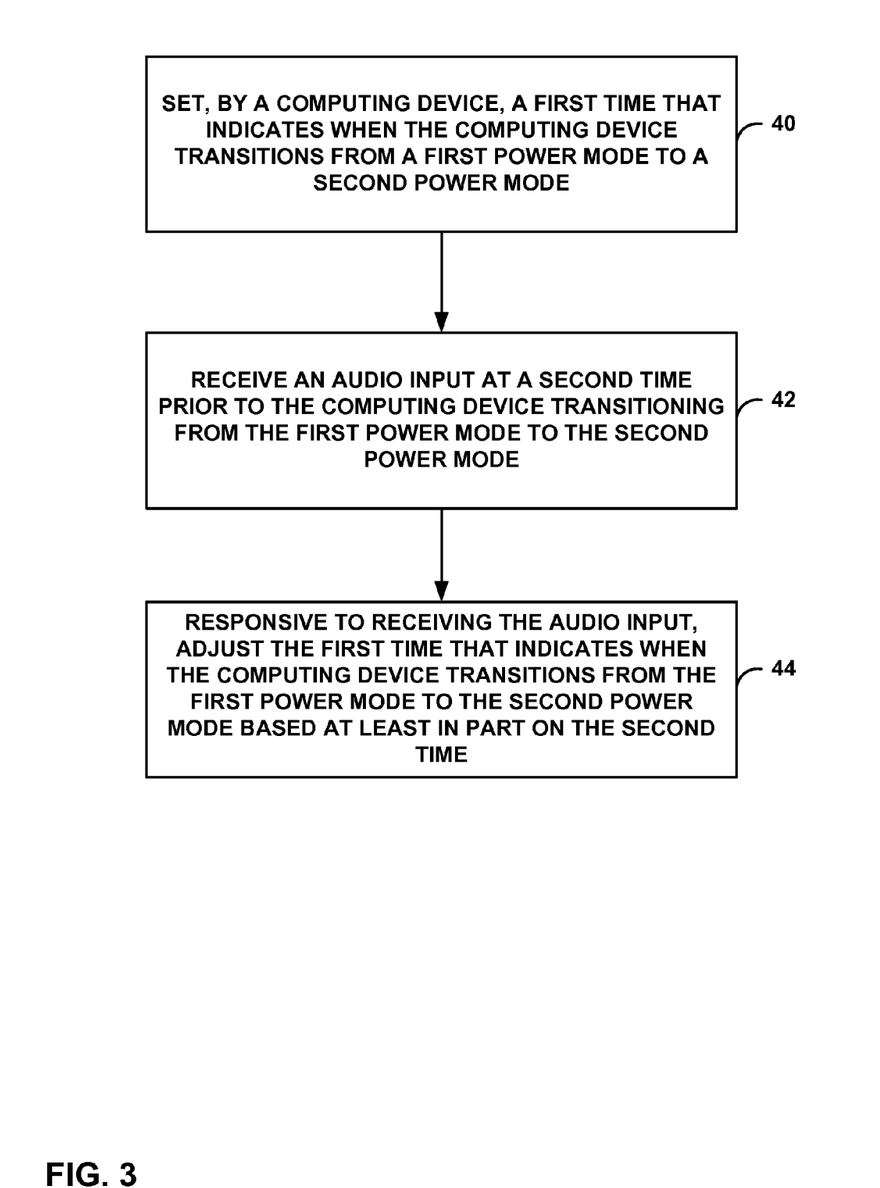
FIG. 3 is a flow diagram illustrating an example operation of a computing device for controlling when a computing device transitions from a first power mode to a second power mode, in accordance with one or more aspects of this disclosure.

FIG. 3 is a flow diagram illustrating an example operation of a computing device for controlling when a computing device transitions from a first power mode to a second power mode, in accordance with one or more aspects of this disclosure. For purposes of illustration only, the example operation is described below within the context of computing device 2 of FIGS. 1 and 2.

Computing device 2 may set a first time that indicates when the computing device transitions from a first power mode to a second power mode (40). As an example, power mode timing module 24 may initiate a timer that indicates when computing device 2 transitions from a first power mode (e.g., a full power mode) to a second power mode (e.g., a reduced power mode) based on a threshold value. Operation of a group of electronic components of computing device 2 (e.g., an audio input device such as microphone 6, one or more processors 34, display 10, etc.) in the first power mode may use a first amount of power (e.g., from battery 35). Operation of electronic components of computing device 2 in the second power mode may use a second amount of power. Power mode timing module 24 may increment or decrement the current time value of the timer. Power mode determination module 26 may compare the current time value of the timer to the threshold value, and may determine that computing device 2 transitions to the second power mode based on the comparison. For instance, power mode determination module 26 may determine that the computing device transitions to the second power mode when the current time value of the timer is at least equal to the threshold value.

Computing device 2 may receive an audio input (e.g., from an audio input device such as microphone 6) at a second time prior to computing device 2 transitioning from the first power mode to the second power mode (42). For instance, computing device 2 may receive an audio input using microphone 6. Responsive to receiving the audio input, computing device 2 may adjust the time that indicates when computing device 2 transitions from the first power mode to the second power mode based at least in part on the second time (44). As an example, audio input module 20 may use voice recognition or other similar techniques to determine that the received audio input includes a voice command indicating that computing device 2 is not to transition to the second power mode. As another example, audio input module 20 may determine a background audio volume level and a volume level of the received audio input. Audio input module 20 may compare the background audio volume level and a volume level of the received audio input to determine a difference between the background audio volume level and the volume level of the received audio input. Audio input module 20 may determine that a magnitude of the difference between the background audio volume level and the volume level of the received audio input is greater than a threshold value. The threshold value may be a configurable value, such as by using user interface 28. Responsive to determining that the magnitude of the difference between the background audio volume level and volume level of the received audio input is greater than the configurable threshold value, audio input module 20 may cause power mode timing module 24 to adjust the time that indicates when computing device 2 transitions to the second power mode. For instance, audio input module 20 may cause power mode timing module 24 to reset a timer initiated by power mode timing module 24.

Figure 4:
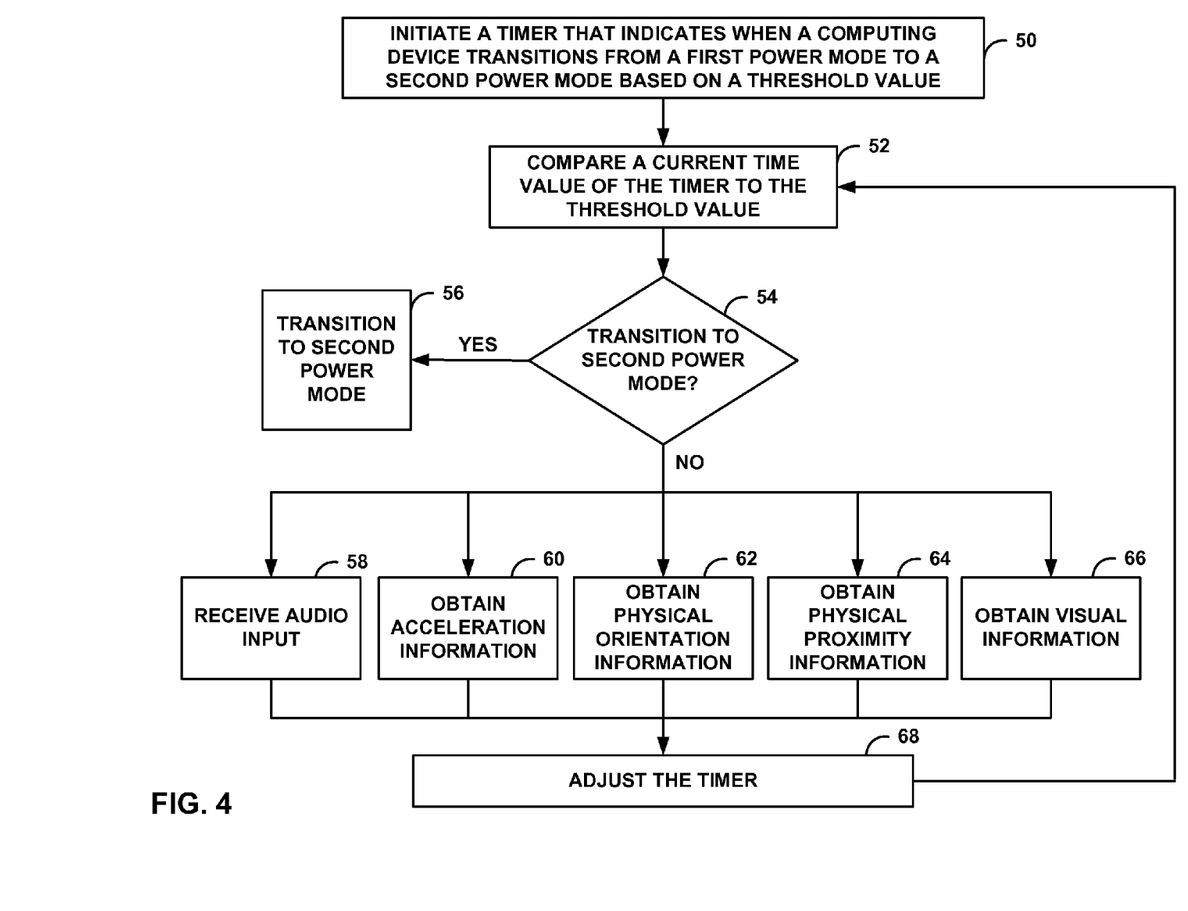
FIG. 4 is a flow diagram illustrating an example operation of a computing device for configuring a timer that indicates when a computing device transitions from a first power mode to a second power mode, in accordance with one or more aspects of this disclosure.

FIG. 4 is a flow diagram illustrating an example operation of a computing device for configuring a timer that indicates when a computing device transitions from a first power mode to a second power mode, in accordance with one or more aspects of this disclosure. For purposes of illustration only, the example operation is described below within the context of computing device 2 of FIGS. 1 and 2.

Computing device 2 may initiate a timer that indicates when computing device 2 transitions from a first power mode to a second power mode based on a threshold value (50). For example, computing device 2 may cause display 10 to display graphical content in a full power mode. In response, power mode timing module 24, executed by one or more processors 34, may initiate a timer that indicates when computing device 2 transitions from the full power mode to a reduced power mode based on a threshold value. For instance, power mode timing module 24 may initiate a timer at a time value of zero seconds, and may increment the timer while the full power mode is the active power mode of computing device 2.

Computing device 2 may compare a current time value of the timer to the threshold value (52). For example, power mode determination module 26 may compare the current time value of the timer to the threshold value. Power mode determination module 26 may determine whether computing device 2 transitions from the first power mode to the second power mode (54). As an example, power mode determination module 26 may determine that computing device 2 transitions to the second power mode when the current time value of the timer is at least equal to the threshold value. For instance, when power mode timing module 24 increments a timer while the full power mode is the current power mode of computing device 2, power mode determination module 26 may determine that computing device 2 transitions to the second power mode when the current time value of the timer is greater than or equal to the threshold value. In examples where power mode timing module 24 decrements a timer while the full power mode is the current power mode of computing device 2, power mode determination module 26 may determine that computing device 2 transitions to the second power mode when the current time value of the timer is less than or equal to the threshold value.

If power mode determination module 26 determines that computing device 2 transitions to the second power mode ("YES" branch of 54), computing device 2 may transition to the second power mode. For instance, computing device 2 may cause display 10 to dim, or may disable display 10, thereby reducing the amount of power consumed by display 10. If power mode determination module 26 determines that computing device 2 does not transition to the second power mode ("NO" branch of 54), computing device 2 may maintain the first power mode (e.g., full power mode) as the active power mode of computing device 2.

Audio input module 20 may receive an audio input using microphone 6 (58). For example, audio input module 20 may receive an audio input that includes a voice command indicating that computing device 2 is not to transition to a second power mode. For instance, a user may provide a voice command, such as "awake," "phone stay awake," or other similar voice commands. Audio input module 20 may use voice recognition or other similar techniques to determine that the voice command indicating that computing device 2 is not to transition to a second power mode has been received. One or more such voice commands may be user-configurable, such as by using user interface 28. In another example, audio input module 20 may determine a background audio volume level and a volume level of the received audio input. Audio input module 20 may determine a difference between the background audio volume level and the volume level of the received audio input. Audio input module 20 may determine that computing device 2 does not transition to the second power mode when the magnitude of the difference between the background audio volume level and the volume level of the received audio input is greater than a configurable threshold value.

Sensor input module 22 may obtain acceleration information from an accelerometer of computing device 2 (60). For example, one or more sensors 8 may include an accelerometer. Sensor input module 22 may determine, based on the obtained acceleration information, that computing device 2 is moving. As such, sensor input module 22 may determine that a user may be actively interacting with computing device 2, and that computing device 2 does not transition to the second power mode.

Sensor input module 22 may obtain physical orientation information from a gyroscope of computing device 2 (62). Similarly, sensor input module 22 may obtain physical orientation information from one or more accelerometers of computing device 2. Sensor input module 22 may determine, based on the obtained physical orientation information, that a physical orientation of computing device 2 indicates that a user may be actively interacting with computing device 2. For example, sensor input module 22 may determine that when computing device 2 is oriented at approximately a forty-five degree angle with respect to the ground, a user may be actively interacting with computing device 2 (e.g., holding computing device 2, such as to view display 10). As such, sensor input module 22 may determine that computing device 2 does not transition to the second power mode.

Sensor input module 22 may obtain physical proximity information from a physical proximity sensor of computing device 2 (64). As an example, the obtained physical proximity information may indicate that the distance between computing device 2 and another object is greater than or equal to a configurable threshold distance. As such, sensor input module 22 may determine that computing device 2 may be not be placed next to a user's ear, such for use as a telecommunications device, or in a user's pocket. Sensor input module 22 may determine that in such a scenario, display 10 may be needed for the current operation of computing device 2.

Sensor input module 22 may obtain visual information from an images sensor of computing device 2(66). For example, computing device 2 may include a user-facing camera that incorporates an image sensor. Sensor input module 22 may use facial recognition, eye tracking, or other similar techniques to determine that a user may be looking at computing device 2. For example, sensor input module 22 may determine that the front of a user's face is directed toward computing device 2. As such, sensor input module 22 may determine that the user may be actively interacting with computing device 2.

Power mode timing module 24 may adjust the timer (68). For example, power mode timing module 24 may reset a timer initiated by power mode timing module 24, and may continue to increment or decrement the timer while the first power mode is the active power mode of computing device 2. Subsequent to power mode timing module 24 adjusting the timer, power mode determination module 26 may compare the current time value of the timer to the threshold value, and may determine whether computing device 2 transitions to the second power mode.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
setting, by a mobile computing device comprising a battery and a group of electronic components, a first time that indicates when the mobile computing device transitions from a first power mode to a second power mode, wherein
operation of the electronic components in the first power mode uses a first amount of power from the battery,
operation of the electronic components in the second power mode uses a second amount of power from the battery that is less than the first amount of power, and
the group of electronic components comprises at least an audio input device;
receiving, by the audio input device, an audio input at a second time prior to the mobile computing device transitioning from the first power mode to the second power mode; and
responsive to receiving the audio input at the second time, adjusting, by the mobile computing device, the first time that indicates when the mobile computing device transitions from the first power mode to the second power mode based at least in part on the second time.

2. The method of claim 1, wherein receiving the audio input comprises receiving a voice command indicating that the mobile computing device is not to transition to the second power mode.

3. The method of claim 1, wherein setting the first time comprises initiating a timer that indicates when the mobile computing device transitions from the first power mode to the second power mode based on a threshold value, the method further comprising:
comparing a current time value of the timer to the threshold value; and
determining whether the mobile computing device transitions from the first power mode to the second power mode based on the comparison.

4. The method of claim 3, wherein determining whether the mobile computing device transitions from the first power mode to the second power mode based on the comparison comprises determining that the mobile computing device transitions from the first power mode to the second power mode when the current time value of the timer is at least equal to the threshold value.

5. The method of claim 3, wherein adjusting the first time that indicates when the mobile computing device transitions from the first power mode to the second power mode comprises adjusting the threshold value by a configurable amount such that a difference between the current time value of the timer and the adjusted threshold value is greater than a difference between the current time value of the timer and the threshold value.

6. The method of claim 3, wherein adjusting the first time that indicates when the mobile computing device transitions from the first power mode to the second power mode comprises adjusting the current time value of the timer such that a difference between the adjusted time value of the timer and the threshold value is greater than a difference between the current time value of the timer and the threshold value.

7. The method of claim 1, further comprising:
determining, by the mobile computing device, a background audio volume level;
determining, by the mobile computing device, a volume level of the received audio input;
comparing, by the mobile computing device, the background audio volume level and the volume level of the received audio input to determine a difference between the background audio volume level and the volume level of the received audio input; and
determining, by the mobile computing device, that a magnitude of the difference between the background audio volume level and the volume level of the received audio input is greater than a configurable threshold value,
wherein adjusting the first time that indicates when the mobile computing device transitions from the first power mode to the second power mode is responsive to determining that the magnitude of the difference between the background audio volume level and volume level of the received audio input is greater than the configurable threshold value.

8. The method of claim 7, wherein the volume level of the received audio input is greater than the background audio volume level.

9. The method of claim 1, further comprising:
displaying a graphical user interface on a display of the mobile computing device,
wherein setting the first time that indicates when the mobile computing device transitions from the first power mode to the second power mode comprises setting the first time in response to the displaying of the graphical user interface.

10. The method of claim 1, further comprising:
obtaining, by the mobile computing device, acceleration information from an accelerometer of the mobile computing device; and
determining, based on the obtained acceleration information, that the mobile computing device is moving,
wherein adjusting the first time that indicates when the mobile computing device transitions from the first power mode to the second power mode is responsive to the determination that the mobile computing device is moving.

11. The method of claim 10, further comprising:
determining, by the mobile computing device, that the acceleration information indicates at least two accelerations of the mobile computing device and at least two decelerations of the mobile computing within a threshold time value,
wherein adjusting the first time that indicates when the mobile computing device transitions from the first power mode to the second power mode is responsive to the determination that the acceleration information indicates at least two accelerations of the mobile computing device and at least two decelerations of the mobile computing within a threshold time value.

12. The method of claim 11, wherein the threshold time value is a configurable threshold time value.

13. The method of claim 1, further comprising:
obtaining, by the mobile computing device, acceleration information from an accelerometer of the mobile computing device; and
determining, based on the obtained acceleration information, a physical orientation of the mobile computing device,
wherein adjusting the first time that indicates when the mobile computing device transitions from the first power mode to the second power mode is responsive to and based on the determined physical orientation.

14. The method of claim 1, further comprising:
obtaining, by the mobile computing device, physical orientation information from a gyroscope of the mobile computing device; and
determining, based on the obtained physical orientation information, a physical orientation of the mobile computing device, wherein adjusting the first time that indicates when the mobile computing device transitions from the first power mode to the second power mode is responsive to and based on the determined physical orientation.

15. The method of claim 1, further comprising:
obtaining by the mobile computing device, physical proximity information from a proximity sensor of the mobile computing device; and
determining, based on the physical proximity information, that a distance of the mobile computing device to another object is greater than or equal to a threshold distance,
wherein adjusting the first time that indicates when the mobile computing device transitions from the first power mode to the second power mode is responsive to the determination that the distance of the mobile computing device to another object is greater than or equal to the threshold distance.

16. The method of claim 1, further comprising:
obtaining, by the mobile computing device, visual information from an image sensor of the mobile computing device; and
determining, based on the visual information, that a user of the mobile computing device is looking at the mobile computing device,
wherein adjusting the first time that indicates when the mobile computing device transitions from the first power mode to the second power mode is responsive to the determination that the user is looking at the mobile computing device.

17. The method of claim 1, wherein the second power mode is a reduced power mode.

18. The method of claim 1, wherein adjusting the first time that indicates when the mobile computing device transitions from the first power mode to the second power mode comprises adjusting the first time such that the mobile computing device does not transition from the first power mode to the second power mode.

19. A non-transitory computer-readable storage medium comprising instructions that, when executed, cause one or more processors of a computing device comprising a group of electronic components to perform operations comprising:
setting a first time that indicates when the computing device transitions from a first power mode to a second power mode, wherein
operation of the electronic components in the first power mode uses a first amount of power,
operation of the electronic components in the second power mode uses a second amount of power that is less than the first amount of power, and
the group of electronic components comprises at least an audio input device;
receiving, by the audio input device, an audio input at a second time prior to the computing device transitioning from the first power mode to the second power mode; and
responsive to receiving the audio input at the second time, adjusting the first time that indicates when the computing device transitions from the first power mode to the second power mode based at least in part on the second time.

20. A computing device, comprising:
at least one processor;
a group of electronic components comprising at least an audio input device configured to receive an audio input; and
a power mode analysis module operable by the at least one processor to:
set a first time that indicates when the computing device transitions from a first power mode to a second power mode;
receive an audio input from the audio input device at a second time prior to the computing device transitioning from the first power mode to the second power mode, wherein
operation of the electronic components in the first power mode uses a first amount of power, and
operation of the electronic components in the second power mode uses a second amount of power that is less than the first amount of power; and
responsive to receiving the audio input at the second time, adjust the first time that indicates when the computing device transitions from the first power mode to the second power mode based at least in part on the second time.

* * * * *